United States Patent
Metzdorf et al.

(10) Patent No.: US 11,988,255 B2
(45) Date of Patent: May 21, 2024

(54) MULTIPLE DISK CLUTCH AND DUAL CLUTCH DEVICE HAVING SUCH A MULTIPLE DISK CLUTCH

(71) Applicant: BorgWarner Inc., Auburn Hills, MI (US)

(72) Inventors: Frederik Johann Metzdorf, Ludwigshafen (DE); Andreas Klassen, Schwetzingen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/306,801

(22) Filed: Apr. 25, 2023

(65) Prior Publication Data

US 2023/0349427 A1 Nov. 2, 2023

(30) Foreign Application Priority Data

Apr. 27, 2022 (DE) ......................... 102022001468.8

(51) Int. Cl.

| | |
|---|---|
| *F16D 25/063* | (2006.01) |
| *B60K 1/00* | (2006.01) |
| *F16D 13/00* | (2006.01) |
| *F16D 13/38* | (2006.01) |
| *F16D 13/54* | (2006.01) |
| *F16D 13/68* | (2006.01) |

(52) U.S. Cl.
CPC .............. *F16D 13/683* (2013.01); *B60K 1/00* (2013.01); *F16D 13/385* (2013.01); *F16D 13/54* (2013.01); *F16D 25/063* (2013.01)

(58) Field of Classification Search
CPC ......... F16D 25/00–14; F16D 21/00–08; F16D 13/00–76; B60K 1/00–02
See application file for complete search history.

(56) References Cited

U.S. PATENT DOCUMENTS

| | | | |
|---|---|---|---|
| 8,556,053 B2 * | 10/2013 | Jakob-Bodenhagen | ................... F16D 25/10 74/330 |
| 9,453,540 B2 | 9/2016 | Agner et al. | |
| 2005/0279605 A1 * | 12/2005 | Sowul | ................. F16D 25/0638 192/48.91 |
| 2007/0034476 A1 * | 2/2007 | Braford, Jr. | ............. F16D 21/06 192/48.603 |
| 2007/0240961 A1 * | 10/2007 | Gremplini | ............... F16D 21/06 192/85.53 |

(Continued)

FOREIGN PATENT DOCUMENTS

| | | |
|---|---|---|
| DE | 102005025773 A1 | 2/2006 |
| DE | 102007045588 A1 | 4/2008 |

(Continued)

*Primary Examiner* — Ernesto A Suarez
*Assistant Examiner* — Lillian T Nguyen
(74) *Attorney, Agent, or Firm* — Howard & Howard Attorneys PLLC

(57) ABSTRACT

A multiple disk clutch with a multiple disk pack and a power transmission device for transmitting an actuating force through openings in a wall of the multiple disk clutch to the multiple disk pack, wherein the power transmission device has transmission fingers that extend through the openings. The openings are at least partially arranged in a first wall section of the wall extending in the axial direction. In addition, the present invention relates to a dual clutch device having at least one such multiple disk clutch.

21 Claims, 1 Drawing Sheet

(56) References Cited

U.S. PATENT DOCUMENTS

| | | | | |
|---|---|---|---|---|
| 2011/0259698 A1* | 10/2011 | Arnold | .................... | F16D 21/06 |
| | | | | 192/48.1 |
| 2012/0152684 A1* | 6/2012 | Hauck | ..................... | F16D 25/10 |
| | | | | 192/70.11 |
| 2017/0261045 A1* | 9/2017 | Chamberlin | ........... | H02K 7/006 |

FOREIGN PATENT DOCUMENTS

| | | | | |
|---|---|---|---|---|
| DE | 102007055151 A1 | 6/2008 | | |
| DE | 102009006647 A1 | 8/2009 | | |
| DE | 102013006857 A1 * | 10/2014 | ............... | H02K 1/32 |
| DE | 102013006858 A1 | 10/2014 | | |
| WO | WO-2008138460 A1 * | 11/2008 | ............. | F16D 21/06 |

\* cited by examiner

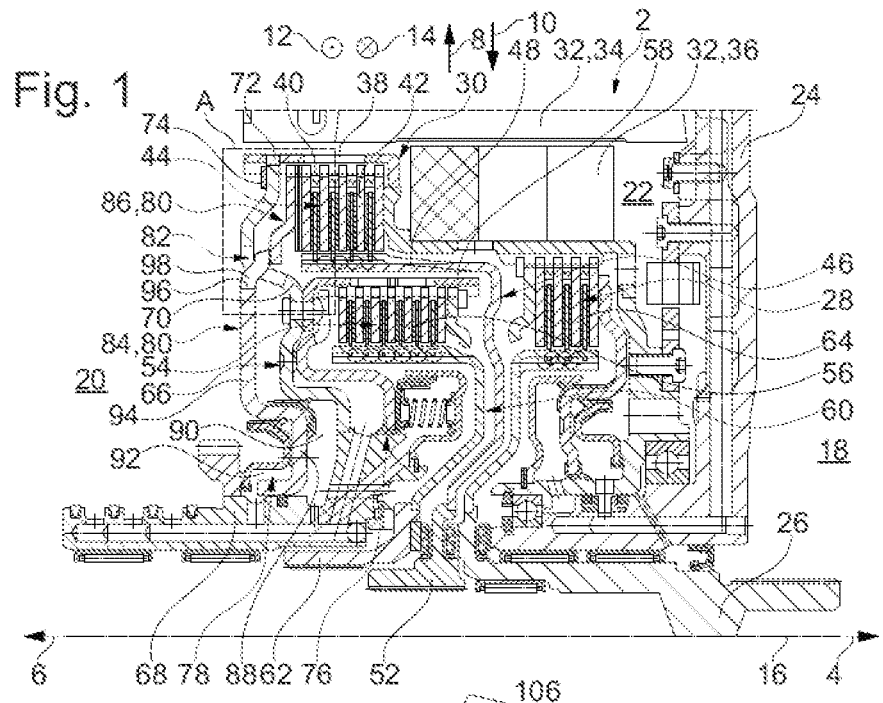
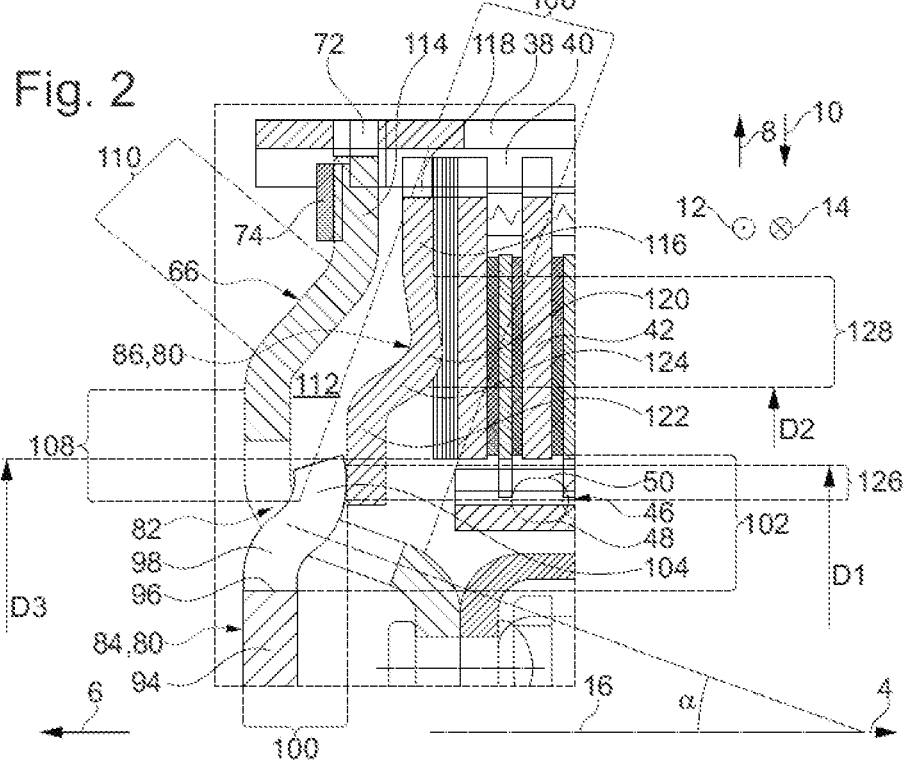

MULTIPLE DISK CLUTCH AND DUAL CLUTCH DEVICE HAVING SUCH A MULTIPLE DISK CLUTCH

CROSS-REFERENCE TO RELATED APPLICATIONS

This application claims priority pursuant to 35 U.S.C. 119(a) to German Application No. 102022001468.8, filed Apr. 27, 2022, which application is incorporated herein by reference in its entirety.

FIELD

The present invention relates to a multiple disk clutch with a multiple disk pack and a power transmission device for transmitting an actuating force through openings in a wall of the multiple disk clutch to the multiple disk pack, wherein the power transmission device has transmission fingers that extend through the openings. In addition, the present invention relates to a dual clutch device having at least one such multiple disk clutch.

BACKGROUND

A dual clutch device is known from US 2005/0279605 A1, the two multiple disk clutches of which each have a multiple disk pack. Both multiple disk clutches are each assigned a power transmission device which is used to transmit an actuating force to the respective multiple disk pack, wherein the transmission of the actuating force takes place through openings in a wall of the multiple disk clutch. Said wall of the multiple disk clutch is formed in each case by a radial section of an outer multiple disk carrier, wherein the radial section in the form of the wall is used to support the respective multiple disk carrier in the radial direction and to achieve a rotational driving connection between radially spaced components of the clutch. In order to be able to transmit the actuating force through the openings in the wall from one side of the wall to the other side of the wall and thus to the multiple disk pack, the power transmission device has a first power transmission element on the side of the wall facing away from the multiple disk pack and a second power transmission element on the side of the wall facing the multiple disk pack. On the first power transmission element there are provided transmission fingers which are formed in one piece with the first power transmission element and which extend in the axial direction through the openings in the wall in order to be supported or to be supportable in the axial direction on the second power transmission element. The second power transmission element is formed by a pressure plate, which is in rotational driving engagement with the outer multiple disk carrier of the respective multiple disk clutch. If the multiple disk pack is acted upon by the actuating force via the power transmission device, the multiple disk pack is supported in the axial direction by a retaining ring on the outer multiple disk carrier, wherein a corresponding load then also acts on the wall formed as a section of the outer multiple disk carrier. Because of this load, the wall can be deformed to a greater extent, which can jeopardize the reliable and long-term operation of the multiple disk clutch within the dual clutch device.

It is therefore an object of the present invention to develop a multiple disk clutch of the generic type in such a way that on the one hand it has a simple and stable structure and on the other hand it ensures reliable and long-term function. In addition, the underlying object of the present invention is to create a dual clutch device with at least one such advantageous multiple disk clutch.

This object is achieved by the features specified in patent claims 1 and 9, respectively. Advantageous embodiments of the invention are the subject matter of the dependent claims.

SUMMARY

The multiple disk clutch according to the invention has a multiple disk pack. The multiple disk pack is preferably composed of inner and outer multiple disks that follow one another in alternation. The multiple disk clutch is preferably a hydraulically actuated or actuatable and/or wet-running multiple disk clutch. In addition, it is preferred if the multiple disk pack is composed of friction lining multiple disks on the one hand and multiple disks without friction lining or steel multiple disks cooperating with the friction lining multiple disks on the other hand. A power transmission device is also assigned to the multiple disk pack of the multiple disk clutch. The power transmission device is used to transmit an actuating force through openings in a wall of the multiple disk clutch to the multiple disk pack. The actuating force preferably acts in the axial direction of the multiple disk clutch and/or is generated hydraulically. Said wall of the multiple disk clutch is preferably a wall-shaped component, via which a rotationally driving connection between two components and/or a support of a multiple disk carrier of the multiple disk clutch takes place in the radial direction. In this case, the wall can be formed, for example, in one piece with a multiple disk carrier of the multiple disk clutch or separately from such a multiple disk carrier and, optionally, only be in rotational driving engagement with it. Furthermore, it is preferred if said wall extends substantially in the radial directions of the multiple disk clutch. The openings within the wall can in principle be lateral incisions within the wall, but it is preferred if the openings are window-like. Furthermore, it is advantageous if at least two, preferably more than two or three, openings are formed in the wall. In addition, it is preferred if the openings in the wall are aligned with one another in the circumferential direction and/or are provided at equal distances from one another. In order to be able to transmit the actuating force to the multiple disk pack through the openings in the wall, the power transmission device has actuating fingers which extend through the openings. In order to create a particularly stable and equally simple multiple disk clutch that ensures reliable and long-term function, the openings are at least partially arranged in a first wall section of the wall that extends in the axial direction. The designation of a first wall section extending in the axial direction comprises both first wall sections that extend exclusively in the axial direction and those first wall sections that enclose an angle of inclination with the axis of rotation of the multiple disk clutch that is greater than 0° and less than 90°. Thanks to the first wall section of the wall, which extends in the axial direction, the wall is stabilized precisely in that section in which the openings can lead to a weakening of the wall, so that the wall of the multiple disk clutch in the region of the first wall section, which is at least partially provided with the openings, has the stability that contributes to reliable and long-term operation without a complex structure or complex production being required as a result.

As already indicated above, the first wall section does not have to extend exclusively in the axial direction. Within the meaning of a simplified production, the first wall section is inclined in the axial direction in a preferred embodiment of the multiple disk clutch according to the invention, and therefore encloses an angle greater than 0° and smaller than 90° with the axis of rotation of the multiple disk clutch. It is preferred here if the first wall section encloses an angle of inclination of at most 45°, particularly preferably less than 25°, with the axis of rotation of the multiple disk clutch. Alternatively or additionally, it is preferred if the first wall section has a rectilinear course. Running around in the circumferential direction, the first wall section preferably forms the lateral surface of a truncated cone, partially pierced by the openings. Irrespective of the respective design variant, the inclination of the first wall section in the axial direction also has the advantage that the opening provided in the first wall section also extends over a correspondingly larger radial section, so that it is easier to guide the transmission fingers in and out.

In an advantageous embodiment of the multiple disk clutch according to the invention, the wall of the multiple disk clutch also has a second wall section which is set back with respect to the multiple disk pack and adjoins the first wall section. Said second wall section preferably adjoins the first wall section outwards in the radial direction. In addition, such a set-back second wall section has the advantage that on the side facing the multiple disk pack there is an increased installation space available, which can be used for a further component or a modified component of the multiple disk clutch, such as for the second power transmission element, which will be described in more detail later. The second wall section preferably extends exclusively in the radial direction or in a radial plane, so that the second wall section is designed in the shape of an annular disk.

In a further preferred embodiment of the multiple disk clutch according to the invention, the openings arranged at least partially in the first wall section of the wall are also arranged at least partially in the second wall section. This allows the transmission fingers of the power transmission device to be guided through in a particularly reliable and simple manner, even if they are extended/designed relatively far in the radial direction.

In a particularly preferred embodiment of the multiple disk clutch according to the invention, the wall has a third wall section adjoining the second wall section and which extends in the axial direction, is optionally inclined in the axial direction and/or is arranged nested with the first wall section in the radial direction. The third wall section requires further stabilization, whereby a third wall section arranged nested in the radial direction with the first wall section has proven to be particularly effective and, moreover, the axial structural length in the region of the wall does not or does not substantially increase. Like the first wall section, the third wall section can also extend exclusively in the axial direction or be inclined in the axial direction to produce an angle of inclination between more than 0° and less than 90° relative to the axis of rotation.

In a particularly advantageous embodiment of the multiple disk clutch according to the invention, more than 50%, preferably more than 70%, of an opening region of the respective opening is formed in the first wall section in order to be able to reliably compensate for a weakening of the wall associated with the openings by the first wall section extending in the axial direction. Moreover, in this embodiment, it is preferable if the opening surface is formed entirely in the first wall section and the aforementioned second wall section of the wall. In the latter case, however, the proportion of the opening surface of the respective opening in the second wall section is preferably less than 50%, particularly preferably less than 30%.

In a further preferred embodiment of the multiple disk clutch according to the invention, the power transmission device has a first power transmission element on the side of the wall facing away from the multiple disk pack and a second power transmission element on the side of the wall facing the multiple disk pack, wherein the first and second power transmission elements are able to be supported or are supported on one another in the axial direction via the transmission fingers. In principle, the first and second power transmission elements could be fastened to one another via these transmission fingers after the transmission fingers have been passed through the openings in the wall, but it is preferred within in the meaning of simpler assembly and disassembly if the two power transmission elements are designed separately from one another, so that they can be released at any time from a position in which they are supported on each other in the axial direction. In addition, it is preferred in this embodiment if the transmission fingers are formed in one piece with the first power transmission element or the second power transmission element in order to simplify assembly. In principle, this can also include design variants in which some transmission fingers are formed in one piece with the first power transmission element and further transmission fingers are formed in one piece with the second power transmission element, but it is preferred if the transmission fingers are formed exclusively in one piece with the first power transmission element or exclusively in one piece with the second power transmission element in order to simplify production and assembly.

According to a further advantageous embodiment of the multiple disk clutch according to the invention, the second power transmission element of the power transmission device is in rotational driving engagement with a multiple disk carrier, preferably a multiple disk carrier section of a multiple disk carrier. It is preferred here if the second power transmission element has an external toothing or an internal toothing which engages in a corresponding internal or external toothing of the respective multiple disk carrier section in order to achieve a rotationally driving connection on the one hand and on the other hand to enable the second power transmission element to be displaced axially in the axial direction. If the second power transmission element uses the toothing that is already present in the multiple disk carrier section of a multiple disk carrier of the multiple disk clutch, then no costly adaptation of the multiple disk clutch is necessary in order to be able to bring the second power transmission element into rotational driving engagement with the multiple disk carrier.

In order to achieve a compact structure, in a further advantageous embodiment of the multiple disk clutch according to the invention, a transfer region is formed between the first and second power transmission element, in which the first and second power transmission element can be supported or are supported on one another, and an application region is formed between the second power transmission element and the multiple disk pack, in which the second power transmission element can be supported or is supported on the multiple disk pack, wherein the largest diameter of the transfer region is smaller than the smallest diameter of the application region. It is preferred if the largest diameter of the transfer region is smaller than the inner diameter of the outer multiple disks of the multiple disk pack of the multiple disk clutch. Thus, the first power transmission element no longer has to extend so far outwards in the radial direction that it is arranged in alignment with the application region or the outer multiple disks in the axial direction, whereby a particularly compact multiple disk clutch is created.

In a further particularly advantageous embodiment of the multiple disk clutch according to the invention, the second power transmission element has a supporting section which is set back in the axial direction in relation to the multiple disk pack and on which the first power transmission element can be supported or is supported. In this way, the transmission fingers between the first and second power transmission element can be made particularly short, whereby their stability is increased. Moreover, thanks to the supporting section set back in the axial direction, the application region in which the second power transmission element can be supported or is supported on the multiple disk pack can be defined extremely precisely, especially since the set-back supporting section cannot be supported or is not supported directly on the multiple disk pack. Furthermore, the setting back of the supporting section ensures that a collision of the second power transmission element with an inner multiple disk carrier of the multiple disk clutch can be prevented, wherein it is therefore preferred in one embodiment if the set-back supporting section of the second power transmission element is arranged aligned in the axial direction with an inner multiple disk carrier of the multiple disk clutch, optionally a multiple disk carrier section of the inner multiple disk carrier.

As already indicated above, in an advantageous embodiment of the multiple disk clutch according to the invention, the transmission fingers are formed in one piece with the first power transmission element, particularly preferably exclusively in one piece with the first power transmission element. Since the transmission fingers are arranged through openings in the first wall section of the wall, which extends in the axial direction, they can be designed to be relatively short and therefore stable. The transmission fingers thus extend in an axial region and a radial region, wherein the radial region is larger than the axial region. In other words, the radial region is longer in the radial direction than the axial region in the axial direction.

According to a further advantageous embodiment of the multiple disk clutch according to the invention, the transmission fingers have an axially protruding and/or arched section for support on the second power transmission element, possibly the set-back supporting section of the second power transmission element. In this way, a well-defined transfer region is created between the first power transmission element and the second power transmission element, which has only a small extent in the radial direction.

As already explained at the outset, the wall of the multiple disk clutch can have the function of a rotational driving connection between two components and/or the function of a radial support for one of the multiple disk carriers of the multiple disk clutch. In a further preferred embodiment of the multiple disk clutch according to the invention, the wall is a rotational driving disk which is in rotational driving engagement with a multiple disk carrier, optionally a multiple disk carrier section of the multiple disk carrier, of the multiple disk clutch. The rotational driving disk is preferably fixed in the axial direction in a detachable manner on the multiple disk carrier or its multiple disk carrier section, wherein the fixing is preferably effected by means of a retaining ring. In the radial inward direction, the rotational driving disk is connected to a clutch hub in a rotationally fixed manner. It has also proven to be advantageous if the rotational driving disk likewise forms a radial supporting section for a multiple disk carrier of an inner multiple disk clutch if the multiple disk clutch according to the invention forms the outer multiple disk clutch in a concentric dual clutch device, as will be explained in more detail later.

The dual clutch device according to the invention has at least one multiple disk clutch of the type according to the invention.

In a preferred embodiment of the dual clutch device according to the invention, this is designed as a concentric dual clutch device. It is preferred here if the multiple disk clutch according to the invention forms a radially outer multiple disk clutch of the concentric dual clutch device, which surrounds a radially inner multiple disk clutch or its multiple disk pack from the outside.

In order to enable the dual clutch device to be used in a hybrid drive train of a motor vehicle in a particularly sensible and compact manner, in another preferred embodiment of the dual clutch device according to the invention, the rotor of an electric machine is attached to an input-side multiple disk carrier of the outer multiple disk clutch, so that the input-side multiple disk carrier of the outer multiple disk clutch can be driven via the electric machine or the rotor can be driven via the input-side multiple disk carrier of the outer multiple disk clutch, depending on whether the electric machine is operated as a motor or generator.

In order to achieve a particularly compact design of the dual clutch device, the rotor of the electric machine is arranged in a further preferred embodiment of the dual clutch device according to the invention in the axial direction aligned with the multiple disk pack of the outer multiple disk clutch.

According to a further preferred embodiment of the dual clutch device according to the invention, a separating clutch is provided for selective torque transmission between a clutch input hub and the input-side multiple disk carrier, wherein the rotor of the electric machine is arranged in a radially slotted manner with the separating clutch, optionally a multiple disk pack of the separating clutch designed as a multiple disk clutch, so that the rotor surrounds the separating clutch or its multiple disk pack from the outside in order to achieve a compact structure.

BRIEF DESCRIPTION

The invention is explained in more detail below using exemplary embodiments with reference to the attached drawings. In the following:

FIG. 1 shows a side view of a dual clutch device integrated into a drive train of a motor vehicle with an electric machine and a separating clutch in a sectional representation; and, FIG. 2 shows an enlarged view of detail A from FIG. 1.

DETAILED DESCRIPTION

FIG. 1 shows a dual clutch device 2 within the drive train of a motor vehicle, wherein a separating clutch is also integrated into the dual clutch device 2 so that, strictly speaking, one can also speak of a triple clutch device. In the Figures, the mutually opposite axial directions 4, 6, the mutually opposite radial directions 8, 10 and the mutually opposite circumferential directions 12, 14 of the dual clutch device 2 are indicated by means of corresponding arrows, wherein the dual clutch device 2 or its components are rotatable about a central axis of rotation 16 extending in the axial directions 4, 6.

The dual clutch device 2 is arranged in the axial direction 4, 6 between a drive unit 18, optionally an internal combustion engine, and a transmission 20, wherein the arrangement in the axial direction 4, 6 between the drive unit 18 and the transmission 20 relates both to the arrangement within the torque transmission path and the spatial arrangement. The dual clutch device 2 is designed as a hydraulically actuatable and wet-running dual clutch device 2, which is why the dual clutch device 2 is arranged within the wet space 22 of a housing 24.

The dual clutch device 2 has a clutch input hub 26 that can be driven by the drive unit 18, wherein the clutch input hub 26 is able to be selectively connected in a rotationally driving manner to an input-side multiple disk carrier 30 of the dual clutch device 2 by means of a separating clutch 28. As can be seen from FIG. 1, the separating clutch 28 is designed as a hydraulically actuatable, wet-running multiple disk clutch. The drive train also has an electric machine 32, wherein the electric machine 32 has a stationary stator 34 on the housing 24 and a rotor 36 that can rotate about the axis of rotation 16, wherein the rotor 36 is attached in a rotationally-fixed manner to the input-side multiple disk carrier 30 of the dual clutch device 2, to be more precise on the side pointing outwards in the radial direction 8. The electrical machine 32 can be operated both as a motor and as a generator.

The input-side multiple disk carrier 30 has a multiple disk carrier section 38 with a rotational driving contour 40 pointing inward in the radial direction 10 for outer multiple disks, so that the input-side multiple disk carrier 30 is an outer multiple disk carrier of the dual clutch device 2. A compressible first multiple disk pack 42 of a first multiple disk clutch 44 is assigned to the multiple disk carrier section 38, wherein the first multiple disk pack 42 is arranged at least partially in the axial direction 4, 6 in alignment with the rotor 36 of the electric machine 32. The first multiple disk pack 42 of the first multiple disk clutch 44 is also assigned a first output-side multiple disk carrier 46, which has a multiple disk carrier section 48 with a rotational driving contour 50 facing outwards in the radial direction 8 toward the inner multiple disks of the first multiple disk pack 42, wherein the first output-side multiple disk carrier 46 in the form of an inner multiple disk carrier is connected to a first clutch output hub 52 in a rotationally-fixed manner on the inside in the radial direction 10. The first clutch output hub 52 can be connected in a rotationally-fixed manner to a first transmission input shaft of the transmission 20 (not shown in detail).

In addition, the dual clutch device 2 has a second multiple disk clutch 54 with a compressible second multiple disk pack 56, to which is assigned a multiple disk carrier section 58 which is in rotationally driving connection with the input-side multiple disk carrier 30 and is designed as an outer multiple disk carrier section, which has a rotational driving contour pointing inward in the radial direction 10 for rotational driving connection with the outer multiple disks of the second multiple disk pack 56. In addition, the second multiple disk pack 56 of the second multiple disk clutch 54 is assigned a second output-side multiple disk carrier 60 in the form of an inner multiple disk carrier, which is connected to a second clutch output hub 62 in a rotationally-fixed manner in the radial direction 10. The second clutch output hub 62 can be connected in a rotationally-fixed manner to a second transmission input shaft, wherein it is preferred if the second transmission input shaft is designed as a hollow shaft through which the first transmission input shaft assigned to the first clutch output hub 52 extends.

The dual clutch device 2 shown is a concentric dual clutch device 2 in which the first multiple disk clutch 44 forms a radially outer multiple disk clutch which surrounds the second multiple disk clutch 54 in the form of a radially inner multiple disk clutch from the outside. More precisely, the first multiple disk pack 42 and the second multiple disk pack 56 are arranged nested in the radial direction 8, 10, wherein the first multiple disk pack 42 surrounding the second multiple disk pack 56 is at least partially in the radial direction 8 on the outside. In addition, the rotor 36 of the electric machine 32 is not only aligned in the axial direction 4, 6 with the first multiple disk pack 42, the rotor 36 is also arranged nested in the radial direction 8, 10 with the separating clutch 28 for selective torque transmission between the clutch input hub 26 and the input-side multiple disk carrier 30. In the specific embodiment according to FIG. 1, in which the separating clutch 28 is also designed as a multiple disk clutch, the rotor 36 is therefore arranged nested with the multiple disk pack 64 of the separating clutch 28 designed as a multiple disk clutch in the radial direction 8, 10, wherein the rotor 36 surrounds the separating clutch 28 or the multiple disk pack 64 in the radial direction 8 on the outside.

As already indicated above, there is a rotational driving connection between the multiple disk carrier section 58 of the radially inner second multiple disk clutch 54 and the input-side multiple disk carrier 30 of the dual clutch device 2. This is achieved by a wall 66 of the first multiple disk clutch 44 and the second multiple disk clutch 54 that extends substantially in the radial direction 8, 10, wherein the wall 66 enables both a support of the multiple disk carrier section 38 and a support of the multiple disk carrier section 58 in the radial direction 10 inwards on a clutch hub 68. In addition, the wall 66 also creates a rotational driving connection between the multiple disk carrier section 38 and the clutch hub 68 and between the multiple disk carrier section 58 and the clutch hub 68, so that a wall 66 in the form of a rotational driving disk 70 is also referred to below.

At its end or circumference pointing outwards in the radial direction 8, the rotational driving disk 70 has a rotational driving contour 72 which is in rotational driving engagement with the rotational driving contour 40 of the multiple disk carrier section 38 and thus with the input-side multiple disk carrier 30. While the rotational driving disk 70 is supported or can be supported in the axial direction 4 on the input-side multiple disk carrier 30, and is therefore fixed, the rotational driving disk 70 can be detached from the multiple disk carrier section 38 of the input-side multiple disk carrier 30 in the axial direction 4. However, in order to prevent the rotational driving disk 70 from become detached in the axial direction 6, the rotational driving disk 70 is also supported or can be supported on the multiple disk support section 38 in the opposite axial direction 6 by means of a retaining ring 74, and is therefore fixed. Thanks to the detachability of the retaining ring 74, one can also speak of a detachable fixing of the rotational driving disk 70 in the axial direction 6 on the multiple disk carrier section 38 of the input-side multiple disk carrier 30.

The multiple disk carrier section 58 of the second multiple disk clutch 54 is fastened in a rotationally-fixed manner to the wall 66 in the form of the rotational driving disk 70, wherein this is done in the embodiment shown by way of example by riveting the multiple disk carrier section 58 to the wall 66. Long-term attachment is an advantage here, but not essential.

Both multiple disk packs 42, 56 are thus arranged on one side in the axial direction 4 next to the wall 66. While the hydraulic actuating device 76 for actuating the second multiple disk clutch 54 is also arranged in the axial direction 4 next to the wall 66, so that power can be transmitted to the second multiple disk pack 56 over a short distance and is rather unproblematic, the hydraulic actuating device 78 for hydraulic actuation of the first multiple disk clutch 44 is, however, arranged on the side of the wall 66 facing away from the first multiple disk pack 42 in the axial direction 6, so that an actuating force of the hydraulic actuating device 78 by means of a special power transmission device 80 has to be transmitted through openings 82 in the wall 66 to the first multiple disk pack 42 of the first multiple disk clutch 44, as will be explained in more detail below with reference to both FIGS. 1 and 2.

The power transmission device 80 has a first power transmission element 84 on the side of the wall 66 facing away from the first multiple disk pack 42 in the axial direction 6 and a second power transmission element 86 on the side of the wall 66 facing the first multiple disk 42 in the axial direction 4. The two power transmission elements 84, 86 are separate from one another and are each formed in one piece, wherein the power transmission elements 84, 86 are able to be supported or are supported on one another in the axial direction 4, 6. The two power transmission elements 84, 86 are preferably designed as shaped sheet metal parts.

A section of the first power transmission element 84 that is on the inside in the radial direction 10 likewise forms an actuating piston 88 that can be displaced in the axial direction 4, 6 and has a substantially U-shaped cross section. A pressure compensation chamber 90 is arranged on the side of the actuating piston 88 pointing in the axial direction 4, while a pressure chamber 92 is arranged on the side pointing in the axial direction 6. Therefore, the actuating piston 88 together with the first power transmission element 84 can be displaced in the axial direction 4 by increasing the hydraulic pressure within the pressure chamber 92 of the hydraulic actuating device 78 in order to generate an actuating force acting in the axial direction 4 on the first multiple disk pack 42. The pressure compensation chamber 90 effects a complete or partial centrifugal oil compensation.

The U-shaped cross section of the actuating piston 88 is adjoined by a radial section 94 of the first power transmission element 84 that is substantially in the shape of an annular disk, which, starting from the actuating piston 88, extends outward in the radial direction 8 to an edge 96 pointing outward in the radial direction 8. Arranged on the edge 96 are a plurality of transmission fingers 98 of the first power transmission element 84, which are spaced apart from one another, optionally evenly, in the circumferential direction 12, 14 and are formed in one piece with the first power transmission element 84, here with the radial section 94 of the first power transmission element 84. The transmission fingers 98 also extend in an axial region 100 and a radial region 102, wherein the latter is larger than the axial region 100. In other words, the expansion of the respective transmission finger in the radial direction 8, 10 is greater than its expansion in the axial direction 4, 6.

It can be seen in particular from FIG. 2 that the transmission fingers 98 each have a section 104 protruding in the axial direction 4, here curved out in the axial direction 4, for support on the second power transmission element 86, which will be described in more detail later. For this purpose, the transmission fingers 98 extend through the aforementioned openings 82 in the wall 66, wherein each transmission finger 98 is preferably assigned an opening 82 through which the corresponding transmission finger 98 extends. The openings 82 in the wall 66 are preferably spaced evenly apart from one another in the circumferential direction 12, 14 and/or aligned with one another in the circumferential directions 12, 14 mentioned.

As can be seen in particular from FIG. 2, the openings 82 are at least partially arranged in a first wall section 106 of the wall 66 extending in the axial direction 4, 6. In concrete terms, it is preferred if more than 50%, particularly preferably more than 70%, of an opening area of the respective opening 82 is formed in the first wall section 106. A first wall section 106 extending in the axial direction 4, 6 can be understood to mean a wall section which extends exclusively in the axial direction 4, 6 or a wall section which is at least inclined in the axial direction 4, 6 and which therefore encloses an angle of inclination with the axis of rotation 16 of the first multiple disk clutch 44 that is greater than 0° and less than 90°. In the illustrated embodiment, the first wall section 106 is inclined in the axial direction 4, 6, wherein the first wall section 106 encloses an angle of inclination a with the axis of rotation 16 of the first multiple disk clutch 44. The first wall section 106 also has a substantially rectilinear course. The angle of inclination a is preferably at most 45°, particularly preferably less than 25°.

In the radial direction 8 outwards, the first wall section 106 is adjoined by a second wall section 108 of the wall 66 which is set back in the axial direction 6 with respect to the first multiple disk pack 42 and which, starting from the first wall section 106—preferably exclusively—extends outwards in the radial direction 8. As can be seen in particular from FIG. 2, the openings 82 in the wall 66 are not only arranged in the first wall section 106 but rather also at least partially in the second wall section 108. The proportion of the opening area of each opening 82 which is arranged in the second wall section 108 is preferably smaller than the proportion of the respective opening area which is arranged in the first wall section 106. It is also preferred if—as shown in FIGS. 1 and 2—the opening area of each opening 82 is formed entirely in the first and second wall sections 106, 108 without the openings 82 extending into other wall sections of the wall 66.

A third wall section 110 adjoins the second wall section 108. The third wall section 110 extends—like the first wall section 106—in the axial direction 4, 6, wherein the third wall section 110 in the illustrated embodiment is also inclined in the axial direction 4, 6 and/or has a rectilinear course. The third wall section 110 is arranged nested at least partially in the radial direction 8, 10 with the first wall section 106. The first, second and third wall sections 106, 108, 110 form a cross-sectionally U-shaped or trough-shaped region of the wall 66, so that a reasonable stiffening of the wall 66 is achieved, which is curved away from the first multiple disk pack 42. This creates an additional clearance 112 in the radial direction 8, 10 between the first wall section 106 and the third wall section 110, which can be used, for example, for the arrangement of the second power transmission element 86, which will be described in more detail later.

As can also be seen from the Figures, the third wall section 110 is adjoined by a wall section 114 of the wall 66, which extends as far as the rotational driving contour 72 of the wall 66, which is in rotational driving engagement with the rotational driving contour 40 of the multiple disk carrier section 38 of the input-side multiple disk carrier 30. The last-mentioned wall section 114 preferably extends exclusively in the radial direction 8, 10, wherein the wall 66 is able to be supported or is supported on the retaining ring 74 in the axial direction 6 via the wall section 114 designed in this way in order to effect the releasable fixing of the wall 66 in the axial direction 6 on the input-side multiple disk carrier 30.

The second power transmission element 86 of the power transmission device 80, which is arranged on the side of the wall 66 pointing in the axial direction 4, has an outer radial section 116 which is substantially in the shape of an annular disk and has a rotational driving contour 118 pointing outwards in the radial direction 8, wherein the rotational driving contour 118 engages in the rotational driving contour 40 of the multiple disk carrier section 38 so that the second power transmission element 86 is in rotational driving engagement with the multiple disk carrier section 38 of the input-side multiple disk carrier 30 of the first multiple disk clutch 44. The outer radial section 116 is designed to protrude and/or bulge in the axial direction 4 in an inner region in the radial direction 10, as indicated by the bulge 120 in FIG. 2. In addition, in the radial direction 10, a supporting section 122, which is set back in the axial direction 6 with respect to the first multiple disk pack 42, adjoins inwardly the outer radial section 116, wherein the supporting section 122 is connected in one piece to the outer radial section 116 via an inclined connecting section 124. The supporting section 122 has a substantially rectilinear course, which preferably extends substantially or exclusively in the radial direction 8, 10.

The supporting section 122 is at least partially arranged within the aforementioned clearance 112 in the radial direction 8, 10 between the first wall section 106 and the third wall section 110 of the wall 66. The supporting section 122 is arranged and dimensioned such that the first power transmission element 84 can be supported or is supported in the axial direction 4 via the transmission fingers 98 extending through the openings 82 on the supporting section 122 of the second power transmission element 86. The supporting section 122 is also arranged in the axial direction 4, 6 in alignment with the multiple disk carrier section 48 of the first output-side multiple disk carrier 46 in the form of an inner multiple disk carrier, so that by setting back the supporting section 122 in the axial direction 6 relative to the first multiple disk pack 42 or the outer radial section 116 a collision between the second power transmission element 86 and the first output-side multiple disk carrier 46 is reliably prevented when the second power transmission element 86 is displaced in the axial direction 4 against the first multiple disk pack 42.

The above-described shaping of the transmission fingers 98 on the one hand and the supporting section 122 on the other creates a transfer region 126 between the first and second power transmission element 84, 86, in which the first and second power transmission element 84, 86 can be or are supported on one another in the axial direction 4, 6, wherein the transfer region 126 has a maximum or largest diameter D1. Between the second power transmission element 86, more precisely between the outer radial section 116 of the second power transmission element 86, and the first multiple disk pack 42, however, an application region 128 is formed, in which the outer radial section 116 of the second power transmission element 86 in the axial direction 4, 6 can be supported or is supported on the first multiple disk pack 42. This application region 128 in turn has a minimum or smallest diameter D2. As can be seen from FIG. 2, the largest diameter D1 of the transfer region 126 is smaller than the smallest diameter D2 of the application region 128, wherein the largest diameter D1 of the application region 128 is preferably also smaller than an inner diameter D3 of the outer multiple disks of the first multiple disk pack 42.

LIST OF REFERENCE NUMERALS 2 dual clutch device
4 axial direction
6 axial direction
8 radial direction
10 radial direction
12 circumferential direction
14 circumferential direction
16 axis of rotation
18 drive unit
20 transmission
22 wet space
24 housing
26 clutch input hub
28 separating clutch
30 input-side multiple disk carrier
32 electrical machine
34 stator
36 rotor
38 multiple disk carrier section
40 rotational driving contour
42 first multiple disk pack
44 first multiple disk clutch
46 first output-side multiple disk carrier
48 multiple disk carrier section
50 rotational driving contour
52 first clutch output hub
54 second multiple disk clutch
56 second multiple disk pack
58 multiple disk carrier section
60 second output-side multiple disk carrier
62 second clutch output hub
64 multiple disk pack
66 wall
68 clutch hub
70 rotational driving disk
72 rotational driving contour
74 retaining ring
76 hydraulic actuating device
78 hydraulic actuating device
80 power transmission device
82 openings
84 first power transmission element
86 second power transmission element
88 actuating piston
90 pressure compensation chamber
92 pressure chamber
94 radial section
96 edge
98 transmission finger
100 axial region
102 radial region
104 protruding section
106 first wall section
108 second wall section
110 third wall section
112 clearance
114 wall section
116 radial section
118 rotational driving contour
120 bulge
122 supporting section
124 connecting section
126 transfer region
128 application region
α angle of inclination D1 diameter
D2 diameter
D3 inner diameter

What is claimed is:

1. A multiple disk clutch with a multiple disk pack and a power transmission device for transmitting an actuating force through openings in a wall of the multiple disk clutch to the multiple disk pack, wherein the power transmission device has transmission fingers that extend through the openings, wherein the openings are arranged at least partially in a first wall section of the wall extending in an axial direction;
wherein the power transmission device has a first power transmission element on the side of the wall facing away from the multiple disk pack and a second power transmission element on the side of the wall facing the multiple disk pack, which can be supported on one another in the axial direction via the transmission fingers; and
wherein between the first and second power transmission element a transfer region in which the first and second power transmission elements can be supported or are supported on one another is formed, and between the second power transmission element and the multiple disk pack an application region is formed, in which the second power transmission element can be or is supported on the multiple disk pack, wherein the largest diameter of the transfer region is formed smaller than the smallest diameter of the application region; and
wherein the first wall section is inclined in the axial direction, and wherein the first wall section encloses an angle of inclination of at most 45° with respect to an axis of rotation of the multiple disk clutch and/or has a rectilinear course.

2. The multiple disk clutch according to claim 1, wherein the wall also has a second wall section, which is set back with respect to the multiple disk pack and adjoins the first wall section.

3. The multiple disk clutch according to claim 2, wherein the second wall section extends in a radial direction and/or in which the openings are at least partially arranged.

4. The multiple disk clutch according to claim 3, wherein the wall has a third wall section adjoining the second wall section, which extends in the axial direction, is inclined in the axial direction, and/or is arranged nested in the radial direction with the first wall section.

5. The multiple disk clutch according to claim 1, wherein more than 50% of an opening area of the respective opening is formed in the first wall section.

6. The multiple disk clutch according to claim 1, wherein the first power transmission element and second power transmission element are formed separately from one another, and wherein the transmission fingers are formed in one piece with the first power transmission element or the second power transmission element and the second power transmission element is in rotational driving engagement with a multiple disk carrier or a multiple disk carrier section of a multiple disk carrier of the multiple disk clutch.

7. The multiple disk clutch according to claim 1, wherein the largest diameter of the transfer region is smaller than the inner diameter of outer multiple disks of the multiple disk pack.

8. The multiple disk clutch according to claim 7, wherein the transmission fingers are formed in one piece with the first power transmission element.

9. The multiple disk clutch according to claim 8, wherein the transmission fingers extend in an axial region and a radial region which is larger than the axial region, and/or the transmission fingers have an axially protruding and/or curved section for support on the second power transmission element.

10. The multiple disk clutch according to claim 7, wherein the second power transmission element has a supporting section which is set back in the axial direction with respect to the multiple disk pack, on which the first power transmission element can be supported or is supported and which is arranged in the axial direction and is arranged in alignment with an inner multiple disk carrier of the multiple disk clutch or a multiple disk carrier section of the inner multiple disk carrier.

11. The multiple disk clutch according to claim 1, wherein the wall is a rotational driving disk which is in rotational driving engagement with a multiple disk carrier of the multiple disk clutch.

12. The multiple disk clutch according to claim 11, wherein the rotational driving disk is releasably fixed to the multiple disk carrier in the axial direction.

13. A dual clutch device with at least one multiple disk clutch according to claim 1, wherein the dual clutch device is designed as a concentric dual clutch device, in which the multiple disk clutch forms a radially outer multiple disk clutch, which surrounds a radially inner multiple disk clutch.

14. The dual clutch device according to claim 13, wherein a rotor of an electrical machine is attached to an input-side multiple disk carrier of the radially outer multiple disk clutch.

15. The dual clutch device according to claim 14, wherein the rotor is aligned in the axial direction with the multiple disk pack of the radially outer multiple disk clutch.

16. The dual clutch device according to claim 15, wherein the rotor is arranged radially nested with a separating clutch for selective torque transmission between a clutch input hub and the input-side multiple disk carrier.

17. The multiple disk clutch according to claim 1, wherein the angle of inclination is less than 25° with respect to the axis of rotation of the multiple disk clutch.

18. A multiple disk clutch with a multiple disk pack and a power transmission device for transmitting an actuating force through openings in a wall of the multiple disk clutch to the multiple disk pack, wherein the power transmission device has transmission fingers that extend through the openings, wherein the openings are arranged at least partially in a first wall section of the wall extending in an axial direction;
wherein the power transmission device has a first power transmission element on the side of the wall facing away from the multiple disk pack and a second power transmission element on the side of the wall facing the multiple disk pack, which can be supported on one another in the axial direction via the transmission fingers; and
wherein the transmission fingers are formed in one piece with the first power transmission element, and wherein the transmission fingers extend in an axial region and a radial region which is larger than the axial region, and/or the transmission fingers have an axially protruding and/or curved section for support on the second power transmission element; and
wherein the first power transmission element and second power transmission element are formed separately from one another, and wherein the second power transmission element is in rotational driving engagement with a multiple disk carrier or a multiple disk carrier section of a multiple disk carrier of the multiple disk clutch.

19. The multiple disk clutch according to claim 18, wherein the second transmission element has a supporting section that supports the transmission fingers.

20. A multiple disk clutch with a multiple disk pack and a power transmission device for transmitting an actuating force through openings in a wall of the multiple disk clutch to the multiple disk pack, wherein the power transmission device has transmission fingers that extend through the openings, wherein the openings are arranged at least partially in a first wall section of the wall extending in an axial direction;

wherein the power transmission device has a first power transmission element on the side of the wall facing away from the multiple disk pack and a second power transmission element on the side of the wall facing the multiple disk pack, which can be supported on one another in the axial direction via the transmission fingers; and wherein between the first and second power transmission element a transfer region in which the first and second power transmission elements can be supported or are supported on one another is formed, and between the second power transmission element and the multiple disk pack an application region is formed, in which the second power transmission element can be or is supported on the multiple disk pack, wherein the largest diameter of the transfer region is formed smaller than the smallest diameter of the application region;

wherein the first power transmission element and second power transmission element are formed separately from one another, and wherein the transmission fingers are formed in one piece with the first power transmission element or the second power transmission element and the second power transmission element is in rotational driving engagement with a multiple disk carrier or a multiple disk carrier section of a multiple disk carrier of the multiple disk clutch; and wherein the second power transmission element has a supporting section which is set back in the axial direction with respect to the multiple disk pack, on which the first power transmission element can be directly supported or directly is supported and which is arranged in the axial direction and is arranged in alignment with an inner multiple disk carrier of the multiple disk clutch or a multiple disk carrier section of the inner multiple disk carrier.

21. A multiple disk clutch with a multiple disk pack and a power transmission device for transmitting an actuating force through openings in a wall of the multiple disk clutch to the multiple disk pack, wherein the power transmission device has transmission fingers that extend through the openings, wherein the openings are arranged at least partially in a first wall section of the wall extending in an axial direction;

wherein the power transmission device has a first power transmission element on the side of the wall facing away from the multiple disk pack and a second power transmission element on the side of the wall facing the multiple disk pack, which can be supported on one another in the axial direction via the transmission fingers; and wherein between the first and second power transmission element a transfer region in which the first and second power transmission elements can be supported or are supported on one another is formed, and between the second power transmission element and the multiple disk pack an application region is formed, in which the second power transmission element can be or is supported on the multiple disk pack, wherein the largest diameter of the transfer region is formed smaller than the smallest diameter of the application region;

wherein the dual clutch device is designed as a concentric dual clutch device, in which the multiple disk clutch forms a radially outer multiple disk clutch, which surrounds a radially inner multiple disk clutch;

wherein a rotor of an electrical machine is attached to an input-side multiple disk carrier of the radially outer multiple disk clutch;

wherein the rotor is aligned in the axial direction with the multiple disk pack of the radially outer multiple disk clutch; and wherein the rotor is arranged radially nested with a separating clutch for selective torque transmission between a clutch input hub and the input-side multiple disk carrier.

* * * * *